US008137655B2

(12) United States Patent
Chornet et al.

(10) Patent No.: US 8,137,655 B2
(45) Date of Patent: Mar. 20, 2012

(54) PRODUCTION AND CONDITIONING OF SYNTHESIS GAS OBTAINED FROM BIOMASS

(75) Inventors: Esteban Chornet, Sherbrooke (CA); Boris Valsecchi, Sherbrooke (CA); Guillaume Drolet, Austin (CA); Martin Gagnon, Sherbrooke (CA); Betty Nguyen, Montreal (CA)

(73) Assignee: Enerkem Inc., Sherbrooke, Quebec (CA)

( * ) Notice: Subject to any disclaimer, the term of this patent is extended or adjusted under 35 U.S.C. 154(b) by 150 days.

(21) Appl. No.: 12/386,767

(22) Filed: Apr. 23, 2009

(65) Prior Publication Data
US 2010/0051875 A1 Mar. 4, 2010

Related U.S. Application Data

(60) Provisional application No. 61/125,837, filed on Apr. 29, 2008.

(51) Int. Cl.
*C01B 3/26* (2006.01)
*C01B 3/38* (2006.01)

(52) U.S. Cl. .................. 423/654; 252/373
(58) Field of Classification Search ............ 423/654
See application file for complete search history.

(56) References Cited

U.S. PATENT DOCUMENTS

| 4,592,762 A * | 6/1986 | Babu et al. ............ 48/197 R |
| 7,247,293 B2 * | 7/2007 | Sorace .................. 423/648.1 |
| 2002/0142208 A1 * | 10/2002 | Keefer et al. ............ 429/34 |
| 2007/0099038 A1 * | 5/2007 | Galloway .................. 429/17 |

* cited by examiner

*Primary Examiner* — Melvin Mayes
*Assistant Examiner* — Kenneth Vaden
(74) *Attorney, Agent, or Firm* — Carella, Byrne et al.; Elliot M. Olstein; Raymond J. Lillie

(57) ABSTRACT

A method of producing and treating synthesis gas in which a biomass-rich material is gasified in a gasifier containing a fluidized bed at a temperature that does not exceed 750° C. to produce a crude synthesis gas product. The crude synthesis gas then is quenched, scrubbed, and then subjected to at least one adsorption step to provide a clean synthesis gas. The clean synthesis gas then may be reformed catalytically to provide a synthesis gas with a desired $H_2$:CO ratio, and/or may be employed in the synthesis of desired chemicals.

18 Claims, 1 Drawing Sheet

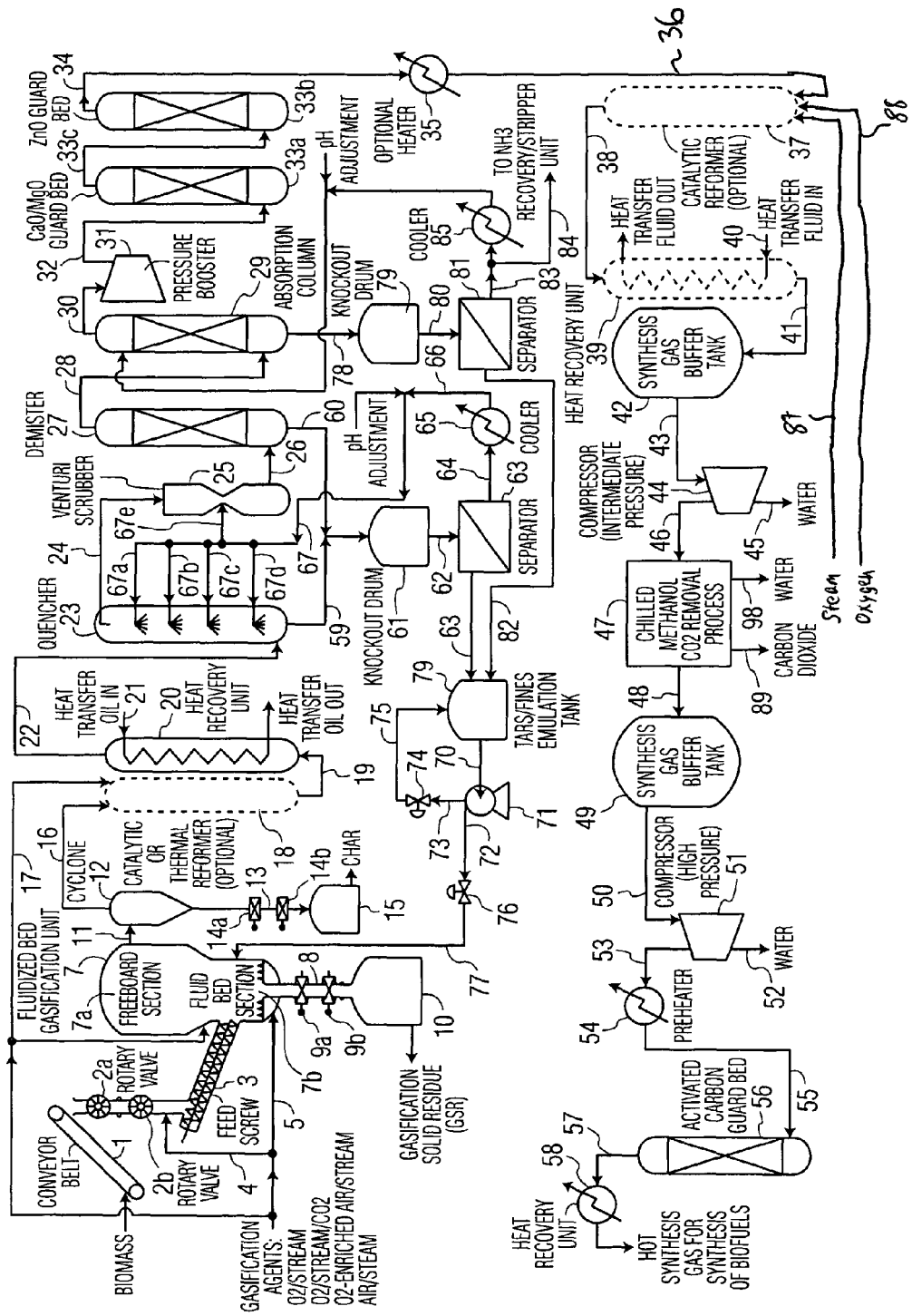

PRODUCTION AND CONDITIONING OF SYNTHESIS GAS OBTAINED FROM BIOMASS

This application claims priority based on provisional application Ser. No. 61/125,837, filed Apr. 29, 2008, the contents of which are incorporated herein by reference in their entirety.

This invention relates to the production of synthesis gas or syngas from biomass, and to the conditioning or cleaning of such synthesis gas as required for the synthesis of alcohols or hydrocarbons from such synthesis gas. More particularly, this invention relates to the production of syngas from biomass by gasifying biomass under low severity conditions to produce crude syngas, followed by conditioning or cleaning of the crude syngas by subjecting the crude syngas to steam reforming, particulate removal, quenching, scrubbing, filtration, and adsorption, prior to employing the synthesis gas in the synthesis of alcohols or hydrocarbons.

Synthesis gas, or syngas, includes carbon monoxide (CO) and hydrogen ($H_2$), with small amounts of carbon dioxide and residual hydrocarbons, and has a variety of uses. Synthesis gas may be used as a fuel gas in gas and steam boiler plants, or synthesis gas may be used to produce other desired materials, such as methanol.

Synthesis gas may be produced by gasifying residual biomass materials, such as forest residues, agricultural residues, spent structural wood materials, and urban biomass, such as municipal solid waste. The gasification of biomass provides a crude synthesis gas which includes impurities such as ammonia ($NH_3$), sulfur (as hydrogen sulfide ($H_2S$) and carbonyl sulfide (COS)), chlorine (as HCl), volatile metals, tars, fines (in the form of submicron particles containing metals and metal salts), and char (solid particulates typically above 0.001 mm and containing metals and metal salts). Such impurities, however, limit the ability of the synthesis gas to be used as a fuel or to be employed in the synthesis of other useful materials.

For example, when synthesis gas is used to produce methanol, the synthesis gas is reacted under pressure in the presence of a catalyst. The impurities in a crude synthesis gas produced as a result of gasifying biomass may poison or deactivate the catalyst.

Various methods have been devised for producing crude synthesis gas from biomass, and then cleaning or conditioning the crude synthesis gas. German Patent No. 4317319 discloses the gasification of biomass in the form of granular, shredded raw materials in two high-pressure, fixed-bed gasification units at temperatures up to 1200° C. Oxygen, water vapor, and raw carbon dioxide ($CO_2$) gas also were introduced into the fixed-bed gasification units. The raw synthesis gas produced in the fixed-bed gasification units is scrubbed and cooled with water and then cooled further with the use of indirect heat exchangers. From these steps, various organic components are removed from the gas stream, such as phenol and tars. These can be recycled back to the fixed bed gasifier or fed to the entrained-flow gasifier described below. The gas stream, free of phenol and tars, then is sent to a combined two-stage gas cooling and scrubbing process step, where mixtures of water and methanol are used to reduce the gas temperature to −25° C. and to remove ammonia, hydrogen cyanide, and residual phenolic compounds. Hydrocarbons, some of which may be halogenated, also are removed. The hydrocarbon-rich compounds recovered from the methanol mixture then can be sent to the entrained-flow gasification unit while the gas stream exiting the low temperature scrubbing unit is dried before it proceeds to a carbonyl sulfide (COS) hydrolysis unit. In that part of the process, the COS in the synthesis gas is reacted with steam to form hydrogen sulfide ($H_2S$) and $CO_2$. The $H_2S$ then is removed from the gas stream in a selective $H_2S$ scrubbing process step. The conditioned synthesis gas is used as fuel in a gas and steam power plant. The $H_2S$-rich stream exiting the selective $H_2S$ scrubbing process is sent to a sulfur recovery process which will produce pure sulfur and a stream of raw $CO_2$. The raw $CO_2$ then is subjected to further purification steps before it is compressed and/or liquefied to manufacture high purity $CO_2$ gas.

Biomass fractions, such as tars and phenols, are used with the fines present in the raw material as feedstock for a high pressure, entrained-flow gasification unit at temperatures reaching 1400° C. Raw synthesis gas from the fixed-bed gasification units also can be introduced and converted in the entrained flow gasifier. The crude synthesis gas stream leaving the entrained flow gasifier is subjected to soot scrubbing. The gas stream then is split into two parallel streams, one of which is fed to a COS hydrolysis unit and the other is fed to a carbon monoxide (CO) conversion unit. The distribution of the synthesis gas stream between those two process units is effected to achieve a desired hydrogen to carbon monoxide ($H_2$/CO) ratio of the gas, which is to be used for a methanol synthesis plant. Both gas streams then are mixed and sent to a cooling stage before the gas is fed to a very-low temperature gas scrubbing process, which uses methanol to reduce significantly the $H_2S$ and $CO_2$ concentrations in the synthesis gas. Through solvent regeneration steps, the $H_2S$ and $CO_2$ are removed from the methanol and they will be sent to the same sulfur recovery and/or purification steps as described for the fixed-bed gasification's synthesis gas conditioning process. The scrubbed synthesis gas is fed to a methanol synthesis plant.

German Patent No. 1003150 discloses the gasification of biomass in three gasification units, two of which are of the fixed-bed type and the third is the entrained-flow type. The synthesis gas, which exits the fixed-bed gasification units, is rich in $CO_2$. The $CO_2$-rich synthesis gas is quenched and cooled. The entrained-flow gasification unit's synthesis gas is scrubbed to remove soot before some of the $CO_2$-rich synthesis gas is added to provide the desired $H_2$/CO ratio for the methanol synthesis plant. The recombined synthesis gas is sent to a CO conversion stage and a cooling stage before it is cooled. All the synthesis gas streams then are sent to a very low temperature scrubbing to purify the synthesis gas further, which then is fed to the methanol synthesis plant. The remainder of the gas is sent either to a gas and steam power plant, or burnt in a boiler after it is mixed with raw, synthesis, and/or natural gas.

The processes described in the above-mentioned German patents are conducted under high severity conditions, and incur high capital and operating costs.

The present invention provides an efficient method of producing crude synthesis gas from biomass, and cleaning and conditioning the crude synthesis gas such that the synthesis gas may be used as a fuel, or in the synthesis of other useful products, such as methanol.

In accordance with an aspect of the present invention, there is provided a method of treating synthesis gas. The method comprises quenching a crude synthesis gas, scrubbing the quenched crude synthesis gas, and subjecting the scrubbed synthesis gas to at least one adsorption step to provide a clean synthesis gas.

As noted hereinabove, the present invention is applicable particularly to the cleaning or conditioning of a crude synthesis gas produced as a result of gasifying biomass or a biomass-rich material. Thus, in accordance with another aspect of the present invention, there is provided a method of producing and treating synthesis gas, or syngas. The method comprises gasifying a biomass-rich material in a gasifier to produce a crude synthesis gas. The crude synthesis gas then is subjected to particulate removal via at least one cyclone, heat recovery and quenching. After quenching, the crude synthesis gas is scrubbed. The scrubbed synthesis gas is subjected to an adsorption or filtration step to provide a clean synthesis gas. In a non-limiting embodiment, the gasifier contains a fluidized bed, and the gasification is effected at a temperature that does not exceed 750° C.

Biomass-rich materials which may be gasified in accordance with the present invention include, but are not limited to, homogeneous biomass-rich materials, non-homogeneous biomass-rich materials, heterogeneous biomass-rich materials, and urban biomass.

In general, homogeneous biomass-rich materials are biomass-rich materials which come from a single source. Such materials include, but are not limited to, materials from coniferous trees or deciduous trees of a single species, agricultural materials from a plant of a single species, such as hay, corn, or wheat, for example, primary sludge from wood pulp, and wood chips.

Non-homogeneous biomass-rich materials in general are materials which are obtained from plants of more than one species. Such materials include, but are not limited to, forest residues from mixed species, and tree residues from mixed species obtained from debarking operations or sawmill operations.

Heterogeneous biomass-rich materials in general are materials that include biomass and non-biomass materials such as plastics, metals, and/or contaminants such as sulfur, halogens, or non-biomass nitrogen contained in compounds such as inorganic salts or organic compounds. Examples of such heterogeneous biomass-rich materials include, but are not limited to, urban biomass such as municipal solid waste, such as refuse derived fuel, solid recovered fuel, sewage sludge, used electrical transmission poles and railroad ties, which may be treated with creosote, pentachlorophenol, or copper chromium arsenate, and wood from construction and demolition operations which may contain one of the above chemicals as well as paints and resins.

In a non-limiting embodiment, the biomass-rich material further includes a material capable of reacting with chlorine and/or sulfur, whereby such material reacts with chlorine and/or sulfur contaminants contained in the crude synthesis gas, produced as a result of gasifying the biomass-rich material, and produces stable salts. Such materials include, but are not limited to, calcium oxide and calcium hydroxide, magnesium oxide, magnesium hydroxide, and magnesium-containing silicates such as olivine.

In general, the gasification of the biomass-rich material is effected under low severity conditions, i.e., at a temperature that does not exceed 750° C. and an absolute pressure that does not exceed 10 atm.

In a non-limiting embodiment, the biomass-rich material is gasified a temperature which does not exceed 725° C. In another non-limiting embodiment, the biomass-rich material is gasified at a temperature which does not exceed 700° C.

In a non-limiting embodiment, the biomass-rich material is gasified at a pressure which does not exceed 3 atm. In another non-limiting embodiment, the biomass-rich material is gasified at a pressure which does not exceed 1.5 atm.

In a non-limiting embodiment, the biomass-rich material is gasified in the gasifier in the presence of at least one gasification agent, which also serves as a fluidization agent.

In another non-limiting embodiment, the at least one gasification agent includes at least one oxidizing agent, which reacts with a portion of the biomass-rich material. Such oxidizing agents include, but are not limited to, oxygen or oxygen-enriched air, for example, whereby the biomass-rich material is oxidized partially.

In another non-limiting embodiment, the fluidization gas further includes steam and/or $CO_2$. In yet another non-limiting embodiment, the fluidization gas is essentially free of nitrogen. In a further non-limiting embodiment, the oxygen content of the fluidizing gas does not exceed 28 vol. %. In another non-limiting embodiment, the oxygen content of the fluidizing gas does not exceed 21 vol. %.

The gasifier includes a fluidized bed that employs an appropriate fluidized bed material. Such materials include, but are not limited to, alumina, olivine, anthracite, desulfurized petroleum coke, and in general, any other refractory material that is stable at the above-mentioned temperatures.

In another non-limiting embodiment, prior to quenching the crude syngas that is produced as a result of gasifying the biomass-rich material, the crude syngas is subjected to steam reforming. In one non-limiting embodiment, tar and pyrolytic carbon fines in the crude syngas are converted via controlled oxidation to intermediates, and the intermediates are subjected to a steam reforming, thereby converting the intermediates to CO and $H_2$.

In a non-limiting embodiment, the gasifier includes a fluidized bed section, and a freeboard section, and the conversion of the tar and pyrolytic carbon fines via controlled oxidation to intermediates and the steam reforming of the intermediates are effected in the freeboard section of the gasifier. In another non-limiting embodiment, the conversion of the tar and pyrolytic carbon fines to intermediates via controlled oxidation of the crude syngas, followed by steam reforming of the intermediates is effected in a separate reaction vessel.

In a non-limiting embodiment, the steam reforming is effected at a temperature of from about 750° C. to about 1000° C. In another non-limiting embodiment, the steam reforming is effected at a temperature of from about 750° C. to about 850° C.

In another non-limiting embodiment, the steam reforming is effected in the presence of a catalyst. Catalysts which may be employed include $Ni.Cr/MgO.La_2O_3.Al_2O_3$ and any other commercial nickel-based reforming catalyst.

In a non-limiting embodiment, the steam reforming catalyst is $Ni.Cr/MgO.La_2O_3.Al_2O_3$. In another non-limiting embodiment, the catalyst comprises 15% Ni, 10% MgO, 5% Cr, 65% $La_2O_3$, and 5% $Al_2O_3$. Such a catalyst is described further in U.S. Pat. No. 5,679,614.

In another non-limiting embodiment, prior to quenching the crude synthesis gas, the crude synthesis gas is subjected to thermal reforming, thereby converting light hydrocarbons present in the crude synthesis gas to CO and $H_2$. In a non-limiting embodiment, the thermal reforming is effected at a temperature of from about 900° C. to about 1,200° C. In another non-limiting embodiment, the thermal reforming is effected at a temperature of from about 1,000° C. to about 1,100° C.

In another non-limiting embodiment, the thermal reforming is effected by the addition of an oxidizing gas in order to raise the temperature of the crude synthesis gas. Such oxidizing gases include, but are not limited to, oxygen, oxygen-enriched air, and air. In another non-limiting embodiment, the oxidizing gas further includes steam and/or $CO_2$. In yet another non-limiting embodiment, the oxidizing gas is essentially free of nitrogen.

In another non-limiting embodiment, prior to quenching the crude synthesis gas, char, which consists of carbon-coated inert solid particles having a diameter of greater than 10 microns, and initially present in the raw material, are removed from the crude synthesis gas. Such removal of solid particles, in a non-limiting embodiment, may be removed by passing the crude synthesis gas through one or more cyclones.

In one non-limiting embodiment, the biomass-rich material is gasified in the fluid bed section of the gasifier under the conditions hereinabove described to produce a crude synthesis gas. The crude synthesis gas then is subjected to controlled oxidation to convert tar and pyrolytic carbon fines to intermediates, followed by steam reforming of such intermediates under conditions as hereinabove described. Such controlled oxidation and steam reforming may be effected in the freeboard section of the gasifier, or in a separate vessel.

Subsequent to the steam reforming, the crude synthesis gas is passed through one or more cyclones to remove therefrom particles having a diameter greater than 10 microns, also known as char. Subsequent to the removal of char from the crude synthesis gas, the crude synthesis gas is subjected to quenching.

In a non-limiting embodiment, the quenching of the crude synthesis gas comprises contacting the crude synthesis gas with alkaline water, thereby cooling the crude synthesis gas and removing condensable materials and tars and fine solid materials therefrom. In a non-limiting embodiment, the crude synthesis gas is subjected to an initial cooling step prior to contacting the crude synthesis gas with alkaline water. Such initial cooling step is effected in a heat recovery or heat exchange unit, in which the crude synthesis gas is cooled by a cold heat transfer oil, whereby the crude synthesis gas is cooled by the transfer of heat from the crude synthesis gas to the transfer oil. Subsequent to such heat transfer, the crude synthesis gas is cooled further by the quenching of the crude synthesis gas with the alkaline water.

Subsequent to quenching, the crude synthesis gas is scrubbed. Such scrubbing which also is conducted with the same alkaline water in the quencher, further removes contaminants such as residual $H_2S$, HCl, and tars as well as fine char particles. In a non-limiting embodiment, the scrubbing is effected at a gas entry temperature of from about 150° C. to about 350° C. and an exit temperature of from about 30° C. to about 90° C. In another non-limiting embodiment, the exit temperature is from about 30° C. to about 70° C. In another non-limiting embodiment, such scrubbing comprises passing the quenched synthesis gas through a venturi scrubber and a demister. In the venturi scrubber, the crude synthesis gas is contacted with the same alkaline water as used in the quencher to remove contaminants such as metals, $H_2S$, and HCl, as well as residual tars and fine char particles. The crude synthesis gas then is passed to the demister for further removal of fine particles and the mist produced at the venturi scrubber. The demister is wetted by the same alkaline scrubbing water used in the venturi scrubber. In one non-limiting embodiment, the tars, fine particles, water, and mist from the quencher, scrubber, and demister are sent to a knockout drum. The tars and fine particles are separated from the water through the use of dissolved air, flotation or centrifuges, and the recovered skimmed phase containing the tars and fine particles then is emulsified, using a recirculation flow system equipped with a homogenizing nozzle. The resulting emulsion is sent to a stirred reservoir and from the reservoir, it is recycled to the gasifier. The water from the air flotation or centrifuge units is recycled to the quencher.

Subsequent to the alkaline scrubbing of the crude synthesis gas the crude synthesis gas, in a non-limiting embodiment, is subjected to a second scrubbing treatment in an absorber in the presence of neutral or slightly acidic water.

Such adsorption step is effected, in a non-limiting embodiment, in an adsorption column which is packed with an absorbent material, which, in a non-limiting embodiment, comprises any known high porosity (i.e., >70%) packing material. Such materials include, but are not limited to, ceramics, and metallic or organic polymers. The packing material may be in the form of Raschig rings, or saddles, or the packing material may have a honeycomb or other acceptable configuration.

As the synthesis gas is passed through the adsorption column, it is contacted with neutral or slightly acidic water, having a pH of from about 4 to about 7. In a non-limiting embodiment, the neutral or slightly acidic water is passed through the adsorption column in a direction countercurrent to the direction of flow of the synthesis gas through the adsorption column. As the synthesis gas is passed through the adsorption column and is contacted with the neutral or slightly acidic water, ammonia, trace tars, residual fines, and trace impurities such as $H_2S$, chlorine, and metals are removed: The ammonia-containing water is sent to a knockout drum, in which air flotation effects the separation of tars and fines from the water. The tars and fines are emulsified, and the emulsion's pH is adjusted before being recycled to the gasifier, along with the emulsion prepared from the tars and fines removed from the scrubber. Ammonia then is separated from the water by steam stripping. Such steam stripping, in a non-limiting embodiment, is effected at a temperature of above 100° C. and at a pressure of from about 1 atm to about 3 atm. The ammonia then may be recovered and purified, or may be recycled to the gasifier for further conversion to $N_2$ and $H_2$.

Optionally, in another non-limiting embodiment, prior to being subjected to the adsorption and filtration, the scrubbed synthesis gas is subjected to dehumidification by passing the scrubbed synthesis gas through a dehumidifying material. In a non-limiting embodiment, the dehumidifying material comprises at least one sulfur-free desiccant material including, but not limited to, alumina, silica, zeolites, calcium sulfate, calcium oxide, and magnesium oxide.

In another non-limiting embodiment, the at least one dehumidifying material is in the form of a reactive adsorption bed, contained in a separate vessel.

In another non-limiting embodiment, the synthesis gas, irrespective of whether such synthesis gas has been subjected to dehumidification as hereinabove described, is preheated to about 400° C. and passed through a reactive adsorption bed of calcium oxide or calcium oxide/magnesium oxide to eliminate traces of chlorine that, as HCl, may remain after scrubbing. In a non-limiting embodiment, the reactive adsorption bed of calcium oxide or calcium oxide/magnesium oxide has a porosity greater than 40%.

Elimination of any trace of sulfur is carried out by heating the gas to 300°-400° C. and then passing the gas through a zinc oxide filtration bed.

In an alternative, but non-limiting embodiment, the treated synthesis gas, after being subjected to the previous steps is subjected to catalytic reforming in order to convert light hydrocarbons present in the synthesis gas to CO and $H_2$. Such catalytic reforming is an alternative to the thermal reforming of the crude synthesis gas prior to quenching the crude synthesis gas. Thus, in a non-limiting embodiment, the biomass-rich material is gasified as hereinabove described. Then, the crude synthesis gas may be subjected to controlled oxidation and steam reforming as hereinabove described, and char particles then may be removed. The crude synthesis gas then is subjected to the quenching, scrubbing, and adsorption steps as described hereinabove, and then subjected to catalytic reforming to convert light hydrocarbons to CO and $H_2$.

In a non-limiting embodiment, the catalytic reforming is effected in either a fluidized catalytic bed or a fixed catalytic bed, or a multi-tubular catalytic flow reactor, which may be preceded as hereinabove described by a filtration guard bed consisting of a suitable material such as, for example, zinc oxide pellets or zinc oxide granular material. Such guard bed is operated at conditions such that the sulfur in the gas reacts readily with the zinc oxide, forming a stable sulfide salt. Suitable catalysts include, but not limited to $Ni.Cr/MgO.La_2O_3.Al_2O_3$ or any commercial nickel-based reforming catalyst supported on a fluidizable support of alumina or olivine. In a non-limiting embodiment, the catalytic reforming is effected at a temperature of from about 750° C. to about 900° C. In another non-limiting embodiment, the catalytic reforming is effected at a temperature of from about 750° C. to about 800° C.

In a non-limiting embodiment, the catalytic reforming is effected at a pressure of from about 1 atm to about 10 atm. In another non-limiting embodiment, the catalytic reforming is effected at a pressure of from about 1 atm to about 3 atm.

In another non-limiting embodiment, subsequent to subjecting the crude synthesis gas, to the quenching, scrubbing, and adsorption and filtration steps mentioned hereinabove, the synthesis gas is subjected to compression before it is conditioned further in order to remove any residual moisture, $CO_2$, and metal carbonyls therefrom. In one non-limiting embodiment, the synthesis gas is compressed such that the $CO_2$ content of the compressed synthesis gas does not exceed 5 vol. %. In another non-limiting embodiment, the synthesis gas is compressed at a pressure of about 5 bars to about 70 bars. In another non-limiting embodiment, the syngas is compressed at a pressure of from about 5 bars to about 10 bars. Metal carbonyls then are removed by using appropriate reactive carbon-based guard beds.

The removal of $CO_2$ may be accompanied either by using amine-based processes or by using chilled methanol. Both approaches also reduce the levels of moisture to trace amounts.

The resulting clean and reformed synthesis gas then is subjected to further processing and conversion into other useful products.

For example, the clean synthesis gas may be reacted in the presence of a catalyst to produce methanol. In another non-limiting embodiment, the synthesis gas is compressed and then is bubbled through a column containing the catalyst in powder or particle form dispersed in an inert oil, whereby trace contaminants in the synthesis gas become dispersed in the oil.

In another non-limiting embodiment, the synthesis gas is compressed at a pressure of from about 5 atm to about 100 atm. In yet another non-limiting embodiment, the clean synthesis gas is compressed at a pressure of from about 5 atm to about 65 atm. In a further embodiment, the synthesis gas is compressed at a pressure of about 60 atm.

In another non-limiting embodiment, the conversion of the synthesis gas to methanol is effected at a temperature of from about 220° C. to about 320° C.

In yet another non-limiting embodiment, the conversion of the synthesis gas to methanol is effected at a temperature of from about 220° C. to about 250° C.

As noted hereinabove, the catalyst is in the form of a powder, which includes particles which in a non-limiting embodiment, have a particle size which does not exceed 800 microns. In another non-limiting embodiment, the catalyst has a particle size which does not exceed 500 microns.

Examples of catalysts which may be employed include, but are not limited to, doped or undoped $CuO/ZnO/Al_2O_3$, $Cu/ZnO/Cr_2O_3$, and $Cu/ZrO_2$ Examples of catalyst dopants include, but are not limited to, alkaline metals such as cesium, potassium, sodium, and lithium.

As mentioned hereinabove, the catalyst particles are dispersed in an inert oil. In a non-limiting embodiment, the inert oil is a mineral oil. An example of a mineral oil which may be employed is Drakeol® 9 mineral oil, a product of Penreco.

The invention now will be described with respect to the drawing, wherein:

FIG. 1 is a schematic of an embodiment of the present invention wherein a biomass material is gasified to produce a crude synthesis gas which is cleaned by subjecting the crude synthesis gas to quenching, scrubbing, and adsorption and filtration steps, followed by compression of the synthesis gas to remove trace impurities.

Referring now to the drawing, a biomass-rich material is passed from a conveyor belt (1) through rotary valves (2a, 2b) into a feed screw (3). The biomass-rich material may include an added material such as calcium oxide or calcium hydroxide, that is capable of reacting with chlorine and sulfur contaminants contained in the crude synthesis gas produced as a result of gasifying the biomass-rich material, thereby producing stable salts. Gasification or oxidizing agents, such as air, oxygen-enriched air, oxygen, steam, and/or $CO_2$, are passed into the feed screw (3) from line (4). The feed screw (3) passes the biomass-rich material and gasification or oxidizing agents into the fluidized bed section (7b) of the gasifier (7). In the fluidized bed section (7b) of the gasifier (7), the biomass-rich material is contacted with an additional amount of gasification or oxidizing agents, such as air, oxygen-enriched air, oxygen, steam, and/or $CO_2$ that are passed into the fluidized bed section (7b) of the gasifier (7) through line (5).

The fluidized bed section (7b) of the gasifier (7) includes an appropriate fluidized bed material, such as alumina, olivine, anthracite, desulfurized petroleum coke, or other refractory materials.

The gasification of the biomass rich material is effected in the fluidized bed section (7b) of the gasifier (7) under low severity conditions. The gasification of the biomass rich material is effected at a temperature that does not exceed 750° C., and a pressure that does not exceed 10 atm. As a result of such gasification, a crude synthesis gas is produced, which contains in addition to CO and $H_2$, light hydrocarbons and impurities such as tars, pyrolytic carbon fines, char (carbon coated inorganics present in feedstock) and other solid residues, and ammonia.

Solid residues which cannot be processed further are passed through line (8) and valves (9a) and (9b) into a drum (10). The remaining crude synthesis gas then is subjected to controlled oxidation in the freeboard section (7a) of the gasifier (7) in the presence of oxidizing agents such as those hereinabove described that are passed into the freeboard section (7a) of the gasifier (7) through line (6). Such controlled oxidation is effected at a temperature of from about 750° C. to about 900° C., and a pressure of from about 1.5 atm to about 10 atm and further converts tar and pyrolytic fines into intermediate products, which then are converted into CO and $H_2$ through steam reforming. Such steam reforming may be effected in the freeboard section (7a) of the gasifier (7), whereby steam is introduced into the freeboard section (7a) of the gasifier (7) through line (6). The steam reforming is effected at a temperature of from about 750° C. to about 900° C., and a pressure of from about 1.5 atm to about 10 atm. Alternatively, the conversion of the tar and pyrolytic carbon fines to intermediates, and the steam reforming of such intermediates, whereby such intermediates are converted to CO and $H_2$, may be effected in a separate reaction vessel (not shown).

The crude synthesis gas then is passed from the freeboard section (7a) of the gasifier (7) through line (11) to the cyclone (12). In the cyclone (12), solid particles having a diameter of greater than 10 microns, known as char, are separated from the crude synthesis gas, passed through line (13), and valves (14a) and (14b), and collected in a drum (15). Alternatively, the crude synthesis gas is passed through two or more cyclones connected in series (not shown), and the char is collected in one or more drums. The crude synthesis gas exists the cyclone (12) through line (16), and is passed to the thermal reformer (18), in which hydrocarbons present in the crude synthesis gas are converted to CO and $H_2$. In thermal reformer (18), the crude synthesis gas is contacted with gasification agents such as those hereinabove described, which are introduced into thermal reformer (18) from line (17). The thermal reforming is effected at a temperature of from about 900° C. to about 1200° C., and a pressure of from about 1.5 atm to about 10 atm.

If the synthesis gas undergoes thermal reforming at temperatures exceeding 900° C., recycle water is injected at the outlet stream (19) of the reformer (18) to lower the synthesis gas temperature to temperatures between 800° C. and 900° C. before entering the heat recovery unit (20).

Alternatively, the crude synthesis gas in line (19) is passed directly to heat recovery unit (20), and catalytic reforming of the light hydrocarbons is effected in catalytic reformer (37), described hereinbelow.

In heat recovery unit (20), the synthesis gas is cooled by a cold heat transfer oil, which passes through heat recovery unit (20) in line (21), and exits heat recovery unit (20) as a hot heat transfer oil. The heat transfer oil may be passed through heat recovery unit (20) in co-current mode, or in countercurrent mode with respect to the direction of flow of the synthesis gas through heat recovery unit (20). The synthesis gas is cooled to a temperature from about 150° C. to about 350° C. The synthesis gas exits the heat recovery unit (20) through line (22) and enters the quencher (23).

In quencher (23), the crude synthesis gas is contacted with alkaline water from lines (67a), (67b), (67c), and (67d), whereby the crude synthesis gas is subjected to further cooling, i.e., to a temperature of from about 60° C. to about 100° C. The alkaline water quenches the crude synthesis gas, and removes tars, fine particles, and other soluble contaminants. The quench water and the tars, fines and other contaminants exit the quencher (23) through line (59), and enter the knockout drum (61).

The quenched synthesis gas exits the quencher (23) through line (24) and enters the venturi scrubber (25), in which the quenched synthesis gas is contacted with alkaline water from line (67e) in order to remove contaminants such as metals, residual $H_2S$, residual HCl, tars, and fine particles. The scrubbing is effected at a temperature of from about 20° C. to about 70° C. The scrubbed synthesis gas exits the venturi scrubber (25) through line (26), and enters the demister (27), in which additional tars and fine particles are removed. The metals, tars, fine particles, and water are removed from the demister (27) through line (60), are combined with the water, tars, fines, and other contaminants in line (59), and passed to the knockout drum (61).

The water, metals, tars, fines and other contaminants then are removed from the knockout drum (61) through line (62) and passed to the separator (63), wherein the water is separated from the tars and fines. The water is removed from the separator (63) through line (64), passed through the cooler (65) into line (66), in which the pH of the water is adjusted so that the water is at a pH of at least 8.5 prior to being passed through lines (67a), (67b), (67c), and (67d) into the quencher (23), and through line (67e) into the venturi scrubber (25). The tars and fines are removed from the separator (63) and passed through line (68) to the emulsion tank (69).

The scrubbed and demisted synthesis gas exits the demister (27) through line (28). In general, the scrubbed and demisted synthesis gas leaves the demister (27) at about 80° C. and 100% relative humidity.

The scrubbed and demisted synthesis gas in line (28) is contacted with neutral or slightly acidic water from line (86) and passed into the adsorption column (29). The water is passed through adsorption column (29) in a direction countercurrent to the flow of the synthesis gas through adsorption column (29). As the synthesis gas and water are passed through the adsorption column (29), ammonia, trace tars, and fines are removed. The water, $H_2S$, chlorine, metals, ammonia, trace tars, and fines are removed from adsorption column (29) through line (78) and passed into knockout drum (79). The water, $H_2S$, chlorine, metals, ammonia, trace tars, and fines then are passed through line (80) into the separator (81), wherein the water and ammonia are separated from the trace tars and fines. The water and ammonia are withdrawn from the separator (81) through line (83).

A fraction of the water and ammonia mixture is removed from the water through line (84), and an ammonia-rich liquor is recovered by means of a stripping unit (not shown). The water is passed through cooler (85) and line (86), in which the pH of the water is adjusted to a neutral or slightly acidic pH. The water in line (86) then contacts the scrubbed and demisted synthesis gas from line (28), and the water and synthesis gas then are passed through the adsorption column (29) as hereinabove described.

The tars and fines are removed from the separator (81) through line (82) and passed into the emulsion tank (69). In tank (69), the tars and fines withdrawn from separators (63) and (81) are mixed to form an emulsion. The pH of the emulsion is adjusted in order to make the emulsion suitable for recycling to gasifier (7). The emulsion then is withdrawn from the tank (69) through line (70), and passed through pump (71). If desired, valve (76) is closed, valve (74) is opened, and the emulsion is passed through line (73), valve (74), and line (75) and recycled to tank (69), and subjected to further emulsion and/or pH adjustment.

When valve (74) is closed and valve (76) is opened, the emulsion of tars and fines is withdrawn from tank (69) through line (70), and passed through pump (71), line (72), valve (76) and line (77) into the fluidized bed section (7b) of gasifier (7), in which the tars and fines are combined with biomass-rich material and gasification agents as hereinabove described to produce a crude synthesis gas.

A cleaned synthesis gas is withdrawn from adsorption column (29) through line (30). In one embodiment, if not subjected to prior thermal reforming as mentioned hereinabove, the pressure of the cleaned synthesis gas is elevated in pressure booster (31), thereby heating the gas before it is passed through line (32) to the guard bed (33a) for moisture removal. The gas then is heated further and passed through line (33c), and through a zinc oxide guard bed (33b) for sulfur removal. The cleaned synthesis gas is withdrawn from guard bed (33b) through line (34). It is then heated further in heater (35), passed through line (36), and then contacted with steam from line (87) and oxygen in line (88) in the catalytic reformer (37), wherein light hydrocarbons contained in the cleaned synthesis gas are subjected to catalytic reforming in the presence of a reforming catalyst such as Ni.Cr/

MgO.La$_2$O$_3$.Al$_2$O$_3$ or any other commercial nickel-based reforming catalyst. When employed, such catalytic reforming is effected at a temperature of from about 750° C. to about 1000° C. and a pressure of from about 1 atm to about 10 atm. As a result of such catalytic reforming, the light hydrocarbons are converted to CO and H$_2$. The cleaned synthesis gas, after the catalytic reforming step, is withdrawn from catalytic reformer (37) through line (38) and passed to heat recovery unit (39).

Alternatively, when the crude synthesis gas is subjected to thermal reforming in thermal reformer (18), the concentrations of light hydrocarbons in the synthesis gas are sufficiently low, and olefins are present at trace levels, the cleaned synthesis gas is withdrawn from adsorption column (29) and sent to the buffer tank (42). In such a case, there would be no need for catalytic reforming and the zinc oxide guard bed for sulfur removal would only be required just prior to the catalytic synthesis of methanol.

In heat recovery unit (39), the cleaned synthesis gas is cooled by a cold heat transfer oil which is passed through line (40). As the cleaned synthesis gas is passed through heat recovery unit (39), the cleaned synthesis gas is cooled, and the heat transfer oil is heated, and exits heat recovery unit (39) in line (40) as a hot transfer oil. In general, the cleaned synthesis gas is cooled to temperatures compatible with the operation of gas compressors. The cleaned and cooled synthesis gas then is passed through line (41) into buffer tank (42).

Prior to employing the cleaned synthesis gas in the synthesis of desired materials, such as methanol, for example, the synthesis gas is subjected to further conditioning. The synthesis gas is withdrawn from tank (42) through line (43) and compressed in compressor (44) to effect the removal of condensable water and other condensable impurities. The compression is effected at a pressure of from about 5 bars to about 10 bars. Water is removed from the compressor through line (45), and the compressed synthesis gas is passed through line (46) into the CO$_2$ removal unit (47) which also acts as a final dehumidifier. Such unit uses a chilled fluid such as methanol. The synthesis gas exits the CO$_2$ removal unit (47) through line (48), and enters buffer tank (49), CO$_2$ is removed from the CO$_2$ removal unit (47) through line (89), and water is removed through line (90). The synthesis gas then exits the buffer tank (49) through line (50). The amount of CO$_2$ left in the synthesis gas that exits the CO$_2$ removal unit (47) through line (48) in general does not exceed 5 vol. %. The synthesis gas in line (48) is passed to buffer tank (49).

For final conditioning, the synthesis gas is withdrawn from buffer tank (49) through line (50), and passed to compressor (51), wherein the synthesis gas is compressed to high pressures. In general, such compression is effected at a pressure of from about 50 atm to about 100 atm. Some trace amounts of water are withdrawn from compressor (51) through line (52), and compressed synthesis gas is recovered from compressor (51) through line (53). In the event that the synthesis gas has undergone thermal reforming and there is no need for additional catalytic reforming of the synthesis gas, the compressed synthesis gas would then be preheated in preheater (54) and passed through line (55) into an activated carbon guard bed (56). The recovered syngas is withdrawn through line (57), its temperature is adjusted in heat exchanger (58), and may be used as feedstock in the synthesis of other desired materials, such as methanol by bubbling through a column (not shown) containing an appropriate methanol synthesis catalyst in particle or powder form dispersed in an inert oil as hereinabove described.

For example, the synthesis gas may be compressed in compressor (55) at a pressure from about 55 atm to about 100 atm. Trace amounts of water are withdrawn from compressor (55) through line (56), and the compressed synthesis gas is withdrawn from compressor (55) through line (57), and bubbled through a column (not shown) containing an appropriate methanol synthesis catalyst in particle or powder form dispersed in an inert oil as hereinabove described.

EXAMPLES

The invention now will be described with respect to the following examples; however, the scope of the present invention is not intended to be limited thereby.

Conversion of Biomass to Syngas

The following is the methodology that was used to convert biomass to syngas in the examples which follow. Particular details with respect to the conversions of biomass to syngas are given in each of the examples.

In the following examples, the gasifier was a fluid bed cylindrical vessel which can process a variety of raw materials, including forest residues, plastics, urban residues (such as sorted and shredded municipal solid waste, demolition wood, etc.), sludges, meat and bone meal, and other biomass materials which have been formed into pellets, briquettes, or granules, and wood chips which may have varying humidities, densities, and/or shapes. If desired, the gasifier also can process petroleum coke, asphaltene-rich residues, coal, and liquid raw materials such as glycerin-rich residues injected through specially developed nozzles. The raw materials to be processed may have a moisture content of up to 40 wt. %.

Depending upon the composition of the feedstock, two systems for feeding the biomass to the gasifier were used. The first system included a conveyor screw or conveyor belt that transports the feedstock (such as, for example, shredded wood, demolition wood, or wood obtained from electrical poles, railroad ties, and the like as described in Example 1 hereinbelow) from a storage area to a first lock hopper. Two interlocking sliding gate valves are located above and below the first lock hopper. The gate valves provide the appropriate seals that permit operation of the feeding system in conjunction with the gasifier, which was pressurized at 1.5 atm. The feedstock is transferred by gravity from the first lock hopper to the second lock hopper through the second sliding gate valve. From the second sliding gate valve, the solids move through one or more rotary valves that control(s) the flow of the solids volumetrically. From the rotary valves, the solids fall onto a feed screw that transfers the solids directly to the fluid bed section of the gasifier.

In a second system, which is designed to transfer less dense or "fluffy" material (such as, for example, refuse derived feedstocks, or RDFs, such as those described in Examples 2 and 3 hereinbelow) to the gasifier, a pneumatic conveyor duct transfers the solids from the storage area to a disengaging cyclone, which has a short bottom leg that directs the solids through a first sliding gate valve into a first lock hopper. A second sliding gate valve directs the material into a second lock hopper. The two sliding gate valves have an interlocking mechanism that pressurizes the lock hoppers during the charging sequences. The lock hoppers are tapered cylinders which avoid compaction of the material. The bottom lock hopper directs the solids onto a conveyor belt placed in a sealed chamber. Load cells, which are activated electronically, control the rate of flow of the raw material toward the gasifier. The conveyor belt passes the raw material to a feed screw that transfers the material into the fluid bed section of the gasifier.

The fluid bed section of the gasifier can process up to 200 kg/hr. of feedstock, and can be operated at a pressure of up to 4 atm. Bed temperature was adjusted by the extent of oxidation and by the amount of water present in and the humidity of the feedstock. Gasification was effected at a temperature that did not exceed 750° C. Bed temperature also was adjusted so as to prevent melting of inert salts that are present in the feedstock. Thus, the bed temperature that was chosen was based in part on the type and amount of inert salts in the feedstock.

As noted hereinabove, air or oxygen-enriched air may be used as partial oxidation agents. The partial pressure of steam inside the reactor may be adjusted to control the primary reforming reactions, which occur in the freeboard section of the reactor where the reaction time is greater than the reaction time in the fluid bed section.

The gasifier was designed to obtain and maintain the desired bed temperature and to minimize particle entertainment. The gasifier includes an enlarged freeboard for the disengagement of alumina and/or other solid fluidized bed materials. A sufficient amount of alumina was present in the fluid bed section for proper heat and mass transfer and for minimizing bed pressure drop. During gasification, feed rate of biomass was from 0.75 to 2.5 kg of biomass per hour per kilogram of alumina.

Neutralization of chlorine (as HCl in the gasifier) and sulfur (as $H_2S$ and COS in the gasifier) was carried out by reaction with CaO or CaO/MgO introduced through a specific port or added to the feed. Chlorine forms $CaCl_2$ and sulfur forms CaS readily. Because not all of the chlorine and sulfur were neutralized in the gasifier, the first scrubbing loop used alkaline scrubbing to achieve a very high degree of removal of HCl, $NH_4Cl$, and $H_2S$ that were formed in the gasifier.

Two cyclones in series collected the coarse particles (over 10 μm) at an efficiency from 90% to 95%. The collected particles fell by gravity into two reservoirs from where they were removed intermittently through interlocking valves.

After the cyclones, an autothermal (non catalytic) reformer raised, if desired, the temperature of the syngas by direct injection of oxygen/steam mixtures. Steam reforming and steam conversion of carbon lower tar and unconverted carbon levels, and carry out partial reforming of the low molecular weight hydrocarbons present in the syngas. Downstream of the autothermal (non catalytic) reformer, injection of water lowered the temperature of the syngas to about 750° C. at the entrance of the heat recovery unit. The latter used either a thermal oil or liquid water (which becomes steam at suitable pressures to be reused fully in the plant).

A bypass valve passes the syngas from the cyclones directly to the heat recovery unit. Such alternative is used when the feedstock contains inorganic materials that form salts with low melting points, which make high temperature (above 800° C.) autothermal reforming undesirable because deposits will form on the walls, leading to scaling and fouling.

Gas conditioning then was carried out through a dual loop system. The first loop included a quencher or spray tower, a venturi scrubber, and a coalescing demister/quench-scrubbing tower to separate the fines and to cool the synthesis gas. Average inlet and outlet gas temperatures were 750° C. and 80° C., respectively. A venturi scrubber, having an appropriate pressure drop, captured the finer particles. A demister equipped with a mesh pad was used to coalesce the entrained fine droplets via an internal impact mechanism. Scrubbing alkaline water, at a pH not exceeding 9.0, was recirculated continuously via a closed loop system. The water was directed to a knockout drum and then a separator, where by flotation (with added chemical agents) a tar and fine particulate-rich overflow was skimmed off and recovered. The bottom underflow, containing heavier organics and particulates, also was removed. The overflow and underflow then were sent to a tank where an emulsion was prepared for reinjection into the gasifier. From the separator, the water was taken by a pump and recirculated to the quencher and venturi scrubber after pH adjustment. A fraction of the recirculated water was withdrawn to maintain a balance of water and contaminants in the system. The withdrawn water was treated in a wastewater treatment system that ensures that the treated water meets any standards required prior to disposal or use. The recirculating water was cooled by a water-water heat exchanger.

The syngas exiting the demister, at about 80° C., was directed to a second scrubbing loop where water at neutral or slightly acidic pH (from 4 to 7) removed ammonia. The ammonia was formed in the gasifier from nitrogen in the feedstock, particularly when amino acids were present in the food residues. Not all of the ammonia was destroyed in the freeboard section of the gasifier, and free $NH_3$ is present in the syngas. The second scrubbing loop decreased the $NH_3$ content in gas exiting the second scrubbing loop. The second scrubbing loop included a scrubbing tower (in the form of a structured packing), a receiving tank for the water, a separator where flotation permitted the skimming off of tar or fine particles, an optional recirculation pump, and a water/water heat exchanger for cooling the water. The tar and fines were sent to the emulsion tank hereinabove described. A fraction of the recirculated water was purged and sent to a wastewater treatment plant.

The syngas from the second scrubbing loop essentially was at its moisture saturation level at about 30° C. It then was preheated to 350° C. to 400° C. and passed through a calcium oxide or calcium/magnesium oxide bed to remove any residual hydrogen chloride (as well as any traces of hydrogen fluoride and other halogens). The syngas then entered a ZnO bed where any residual sulfur forms stable ZnS. These operations were carried out typically at 2-4 bar. The calcium oxide bed also filtered fine particulates that were still present in the gas after the scrubbing.

The syngas exiting the zinc oxide bed was at 350-400° C. It was heated further to 750-800° C. by injection of oxygen/steam. At this temperature it entered the catalytic reforming unit where a proprietary catalytic formulation which can handle residual tar, converts the molecular weight hydrocarbons into additional $H_2$ and CO. The catalytic reformer was either: (i) a fixed bed of granular catalyst beads; or (ii) a fluidized bed where the catalyst (prepared as non-abradable particles having a 200 micron diameter as typical size) acts as the bed itself.

At the exit of the catalytic reformer heat was recovered through a heat exchanger and used in the plant. Steam was condensed as hot water. The latter also was reused.

The cold syngas then was compressed to a 10-15 bar total pressure. The gas entered a scrubbing tower where $CO_2$ is removed to a desired level (typically 2.5-3.5 vol. % of $CO_2$) The scrubbing was conducted with chilled methanol. (Alternatively, the scrubbing may be conducted with amines.) The $CO_2$ recovered from the scrubbing essentially was pure.

The syngas containing $H_2$, CO, $CO_2$ (2.5-3.5 vol. %), residual methane (typically around 1 vol. %) and traces of other hydrocarbons, can be used in methanol synthesis. The syngas was passed through an activated carbon column to lower the concentration of metal carbonyls essentially to trace levels, thereby avoiding contamination of the methanol synthesis catalyst.

Example 1

Gasification of Wood with Oxygen and Steam

Shredded wood, which was obtained from various species of hardwood and coniferous trees, and having a moisture content of 22 wt. %, was used as a prototype of residual biomass obtained from sawmills that process demolition wood, electrical poles, railroad ties, and like materials. The shredded wood was converted to syngas according to the methodology hereinabove described. The shredded wood had the following composition on a dry basis:

| | |
|---|---|
| inert materials (obtained as ash at 750° C.) | 0.7 wt. % |
| carbon | 50.0 wt. % |
| hydrogen | 6.0 wt. % |
| oxygen | 42.5 wt. % |
| nitrogen | 0.1 wt. % |
| sulfur | trace |
| chlorine | 0.7 wt. % |

The shredded wood was fed into the fluidized bed section of the gasifier at 185 kg/hr. Gasification was effected at a pressure of 1.5 atm in the presence of a mixture of 21 vol. % oxygen and 79 vol. % steam. The fluidizing agent included alumina particles having a size of from about 400 microns to about 600 microns. Gasification was effected in an autothermal mode, i.e., without any external addition of heat because the required heat was provided as a result of the partial oxidation of the thermally decomposed feed upon entrance to the gasifier.

The conversion of the wood to syngas was effected over a period of 37 hours.

The syngas yield, after the water scrubbing sequence, was 0.86 Nm$^3$ dry syngas/kg dry biomass. As used herein, the term "N" means normal conditions, i.e., 0° C. and 1 bar as absolute pressure. The dry syngas included the following components (in vol. %) as shown in Table 1 below.

TABLE 1

| Gas component | After water scrubbing (before the CaO and ZnO beds) | After catalytic reforming at 3 bar total pressure, 800° C. (using a steam/carbon ratio of 1.3 mol/mol) | After removal of CO$_2$ from syngas |
|---|---|---|---|
| N$_2$ and Ar | 0.26 | 0.15 | 0.21 |
| H$_2$ | 20.46 | 45.02 | 64.87 |
| CO | 21.95 | 22.42 | 32.32 |
| CO$_2$ | 40.85 | 32.33 | 2.48 |
| CH$_4$ | 7.10 | 0.08 | 0.12 |
| C2s | 4.67 | 0 | 0 |
| C3s | 3.46 | 0 | 0 |
| >C3 | 1.24 | 0 | 0 |
| Benzene (as part of >C3) | 1.01 | 0 | 0 |
| Toluene (as part of >C3) | 0.1226 | 0 | 0 |
| Ethylbenzene (as part of >C3) | 0.0204 | 0 | 0 |
| Xylenes (as part of >C3) | 0.0153 | 0 | 0 |
| Styrene (as part of >C3) | 0.1270 | 0 | 0 |
| Phenol (as part of >C3) | 0.0002 | 0 | 0 |
| Methylstyrene (as part of >C3) | 0.0088 | 0 | 0 |
| Indene (as part of >C3) | 0.0068 | 0 | 0 |
| Naphthalene (as part of >C3) | 0.0049 | 0 | 0 |
| Methylnaphthalene (as part of >C3) | 0.0080 | 0 | 0 |
| Phenanthrene (as part of >C3) | 0.0000 | 0 | 0 |
| NH$_3$ | 0.0105 | 0.0000 | 0 |
| H$_2$S | 0.0000 | 0.0000 | 0 |
| Particulates (mg/Nm$^3$) | 8 | 2 | <1 |

The CaO and ZnO beds did not change the gas composition but lowered the particulate level to 2 mg/L.

The organic compounds listed in Table 1 are low molecular weight components of the tar.

Methanol synthesis was carried out with the conditioned syngas using a three phase reactor in which a Cu/ZnO/Al$_2$O$_3$ catalyst was suspended. The latter performed well at 65 bar total pressure and 230° C., and provided methanol yields above 1 kg methanol/kg catalyst/hr and a selectivity of 99% methanol in recovered liquid in tests carried out two months apart, indicating that no appreciable deactivation from contaminants took place.

Example 2

Gasification of Refuse Derived Fuel Using Oxygen and Steam

Refuse derived fuel, or RDF, is the residue obtained subjecting municipal solid waste, i.e., residential garbage, to primary shredding, sorting, composting, and separation of the composted fraction. The residue in general is a fluffy material that can be shredded further to provide fragments having a size between 2 and 5 cm. The fluffy material entered a pneumatic processing sequence where glass and metals (ferrous and aluminum) were removed and recovered, thereby providing a feedstock that can be converted into a clean syngas. The RDF samples then were converted to syngas as hereinabove described, and as explained in further detail below.

Various samples of RDF from Canadian cities were tested. The RDF samples had a moisture content of 20-25 wt. %. The RDF samples then were exposed to convection air in a well ventilated storage room or in a sealed low temperature dryer to bring the moisture content down to between 10 wt. % and 20 wt. %. The RDF then was pelleted to bring the moisture content to below 10 wt. % if desired.

The RDF samples that were gasified had an average moisture content of 15 wt. %. The samples were fed to the gasifier at rates of from 120 to 165 kg/hr. In one representative sample, the RDF had a composition as follows:

| | |
|---|---|
| inert materials (obtained as ash at 750° C.) | 18.3 wt. % |
| carbon | 44.3 wt. % |
| hydrogen | 6.9 wt. % |
| oxygen | 28.9 wt. % |
| nitrogen | 0.5 wt. % |
| sulfur | 0.3 wt. % |
| chlorine | 0.8 wt. % |

Gasification was conducted in the fluidized bed section of the gasifier in the presence of oxygen and steam at a ratio of 21 vol. % oxygen to 79 vol. % steam. An emulsion of tar, fines, and water that was injected into the fluid bed section prevented the temperature of the fluid bed section from exceeding 750° C. Oxygen and steam also were injected into the freeboard section of the gasifier to provide slightly higher temperatures in the freeboard section.

The syngas yields of the samples, after the water scrubbing sequence, were from to 0.90 Nm³ dry syngas/kg dry feed. Neutralization of a large fraction of the chlorine and a smaller fraction of the sulfur was carried out in the fluid bed and freeboard sections of the gasifier by injection of calcium oxide with the feed. The conversion of the RDF samples to syngas were carried out over a period of several days. A representative sample of dry syngas included the following components (in vol. % unless indicated otherwise) as shown in Table 2 below.

TABLE 2

| Gas component | After water scrubbing (before the CaO and ZnO beds) | After catalytic reforming at 3 bar total pressure, 800° C. (using a steam/carbon ratio of 1.3 mol/mol) | After removal of $CO_2$ |
|---|---|---|---|
| $N_2$ and Ar | 0.81 | 0.38 | 0.53 |
| $H_2$ | 11.87 | 47.09 | 65.00 |
| CO | 20.38 | 23.16 | 31.97 |
| $CO_2$ | 41.07 | 29.32 | 2.43 |
| $CH_4$ | 9.94 | 0.05 | 0.07 |
| C2s | 10.24 | 0 | 0 |
| C3s | 4.99 | 0 | 0 |
| >C3 | 0.71 | 0 | 0 |
| $NH_3$ | 0.0600 | 0.0000 | 0 |
| $H_2S$ and COS | 0.0164 | 0.0000 | 0 |
| HCl | 0.0002 | 0.000 | 0 |
| Particulates (mg/Nm³) | 13 | 2 | <1 |

Example 3

A sample of RDF was converted to syngas as described in Example 2 hereinabove except that the gasification of the RDF was effected in the presence of air and steam at a ratio of 75 vol. % air to 25 vol. % steam. The steam was introduced as water, both as moisture accompanying the solid feed and from the emulsion, which also included tars and particulates recovered from the scrubbers, that was recycled to the gasifier.

The amounts of various elements in different materials involved in or produced as a result of the conversion of the RDF to syngas were determined. The results are shown in Table 3 below.

TABLE 3

| Element | Element in raw material fed to gasification reactor (kg/h) | Element in syngas after the gas conditioning sequence: N as $NH_3$; Cl as HCl; S as $H_2S$ + COS (kg/h) | Element in solid residues from process (recovered at cylcones and withdrawn from fluid bed (kg/h) | Element in scrubbing water (kg/h) | Elements found in CaO and ZnO filters (kg/h) |
|---|---|---|---|---|---|
| N | 0.566 | 0.0000418 | 0.057 | 0.00556 | 0 |
| Cl | 0.871 | 0 | 0.557 (in $CaCl_2$) | 0.08712 (in NaCl and $CaCl_2$) | 0 |
| F | 0.000001448 | 0 | 0.00000130 | trace | 0 |
| S | 0.317 | 0 | 0.142 (in CaS) | 0.0173 (in $CaSO_4$) | 0 |
| Sb | 0.000079646 | 0.000009271 | 0.00006372 | 0.00000048 | 0.000006181 |
| As | 0.000162926 | 0.000018860 | 0.00007332 | trace | 0.000044006 |
| Cd | 0.000181029 | 0.000004258 | 0.00008146 | 0.00008146 | 0.000000473 |
| Cr | 0.015613714 | 0.000015397 | 0.01537951 | 0.00015614 | 0.000035927 |
| Hg | 0.000056571 | 0.000015436 | 0.00000113 | 0.00000396 | 0.000036017 |
| Pb | 0.013350857 | 0.000078103 | 0.01228279 | 0.00066754 | 0.000312410 |
| Co | 0.000226286 | 0.000001948 | 0.00022400 | 0.00000011 | 0.000000216 |
| Cu | 0.002828571 | 0.000004964 | 0.00280752 | 0.00001344 | 0.000001241 |
| Mn | 0.017876571 | 0.000005212 | 0.01780085 | 0.00004469 | 0.000003475 |
| Ni | 0.004865143 | 0.000056461 | 0.00457964 | 0.00004573 | 0.000131742 |
| Sn | 0.005657143 | 0.000075578 | 0.00533627 | 0.00014143 | 0.000075578 |
| V | 0.000565714 | 0.000027774 | 0.00049779 | 0.00000665 | 0.000018516 |
| Tl | 0.000090514 | 0.000004073 | 0.00008146 | 0.00000226 | 0.000000453 |
| Total inorganics | 20.69 (as ash) | 0.002 (as particulates) | 29.11 (includes unconverted carbon) | 1.54 (includes unconverted carbon) | 0.0416 |

The above results show that the gas, prior to catalytic reforming is rather clean with no Cl or S and with a concentration of particulates (0.002/212.65=1.337 mg/Nm³) that does not affect the reformer's performance.

Example 4

A sample of RDF was converted to syngas. Gasification of the RDF was effected in the presence of air and steam at a ratio of 75 vol. % air and 25 vol. % steam. The steam was introduced as water, both as moisture accompanying the solid feed, and from the emulsion, which also included tars and particulates, that was recycled to the gasifier. The RDF had a moisture content of 10 wt. % and was fed into the gasifier at a flow rate of 130 kg/hr. Gasification was effected at 740° C. and at a pressure of 1.5 bar. After gasification and conditioning according to the methodology hereinabove described, catalytic reforming was effected in the presence of a nickel catalyst.

The amounts of chlorine, sulfur, and nitrogen were monitored at various stages of the conversion and conditioning process. The results are shown in Table 4 below.

| Component | Entered into gasifier from feedstock (kg/h) | Recovered in the solid residues from cyclones and from the fluidized bed (kg/h) | Found in wastewater (kg/h) | In syngas after scrubbing (kg/h) | In syngas after CaO and ZnO beds (kg/h) |
|---|---|---|---|---|---|
| Cl | 0.9009 | 0.8903 | 0.0101 | 0.0004 (2 mg/Nm$^3$) | 0 |
| S | 0.3585 | 0.3214 | 0.0163 | 0.0208 | 0 |
| N (as NH$_3$ equivalent) | 0.604 | 0 | 0.0009 | 0.0294 | 0.0294 |

The above results show that all of the chlorine and sulfur can be removed prior to catalytic reforming. Nitrogen, present as NH$_3$, enters the catalytic reforming step. As a result of the catalytic reforming in the presence of a nickel catalyst, the NH$_3$ was converted to N$_2$ and H$_2$. Most of the input nitrogen in the RDF prior to gasification was in the form of NH$_2$ groups that were present in the amino acids remaining in the RDF after the mechanical sorting and biodrying and biocomposting conducted prior to gasification.

The disclosures of all patents and publications (including published patent applications) are herein incorporated by reference to the same extent as if each patent and publication were specifically and individually incorporated by reference.

It is to be understood, however, that the scope of the present invention is not to be limited to the specific embodiments described above. The invention may be practiced other than as particularly described and still be within the scope of the accompanying claims.

What is claimed is:

1. A method of producing and treating synthesis gas, comprising:
   (a) gasifying a biomass rich material in the presence of (i) air, oxygen-enriched air, and/or oxygen and (ii) steam in a gasifier containing a fluidized bed at a temperature that does not exceed 750° C. to produce a crude synthesis gas;
   (b) subjecting said crude synthesis gas to steam reforming in the presence of steam and air, oxygen-enriched air, and/or oxygen at a temperature of from about 750° C. to about 1,000° C.;
   (c) quenching said crude synthesis gas from step (b);
   (d) scrubbing said quenched synthesis gas from step (c); and
   (e) subjecting said scrubbed synthesis gas to at least one adsorption step to provide a clean synthesis gas.

2. The method of claim 1 wherein said biomass-rich material is gasified at a temperature that does not exceed 725° C.

3. The method of claim 2 wherein said biomass-rich material is gasified at a temperature which does not exceed 700° C.

4. The method of claim 1 wherein said biomass-rich material is gasified at a pressure which does not exceed 3 atm.

5. The method of claim 4 wherein said biomass-rich material is gasified at a pressure which does not exceed 1.5 atm.

6. The method of claim 1 wherein said quenching of said crude synthesis gas comprises contacting said crude synthesis gas with alkaline water.

7. The method of claim 1 wherein said steam reforming is effected at a temperature of from about 750° C. to about 850° C.

8. The method of claim 1 wherein said steam reforming is effected in the presence of a catalyst.

9. The method of claim 8 wherein said catalyst comprises NiCr/MgO.La$_2$O$_3$.Al$_2$O$_3$.

10. The method of claim 1 wherein said scrubbing of said synthesis gas is effected at a gas entry temperature of from about 150° C. to about 350° C., and an exit temperature of from about 30° C. to about 90° C.

11. The method of claim 1 wherein said at least one adsorption step comprises passing said synthesis gas through an adsorption column packed with at least one material having a porosity of greater than 40%.

12. The method of claim 1 wherein said scrubbing of said synthesis gas comprises:
   (i) scrubbing said synthesis gas under alkaline conditions; and
   (ii) scrubbing said synthesis gas at a pH of from 4 to 7.

13. The method of claim 1 wherein said at least one adsorption step comprises:
   (i) passing said scrubbed synthesis gas through a reactive adsorption bed comprising calcium oxide or calcium oxide and magnesium oxide; and
   (ii) passing said scrubbed synthesis gas through a zinc oxide filtration bed.

14. The method of claim 1, and further comprising:
   (f) subjecting said synthesis gas, subsequent to step (e), to catalytic reforming in the presence of a catalyst.

15. The method of claim 14 wherein said catalyst is NiCr/MgO.La$_2$O$_3$.Al$_2$O$_3$.

16. The method of claim 14 wherein said catalytic reforming is effected at a temperature of from about 750° C. to about 900° C.

17. The method of claim 16 wherein said catalytic reforming is effected at a temperature of from about 750° C. to about 800° C.

18. The method of claim 1 wherein said fluidized bed includes one or more materials selected from the group consisting of alumina, olivine, anthracite, and desulfurized petroleum coke.

* * * * *